April 26, 1960 H. O. KRON ET AL 2,933,937
VALVE OPERATORS
Filed April 24, 1959 2 Sheets-Sheet 1
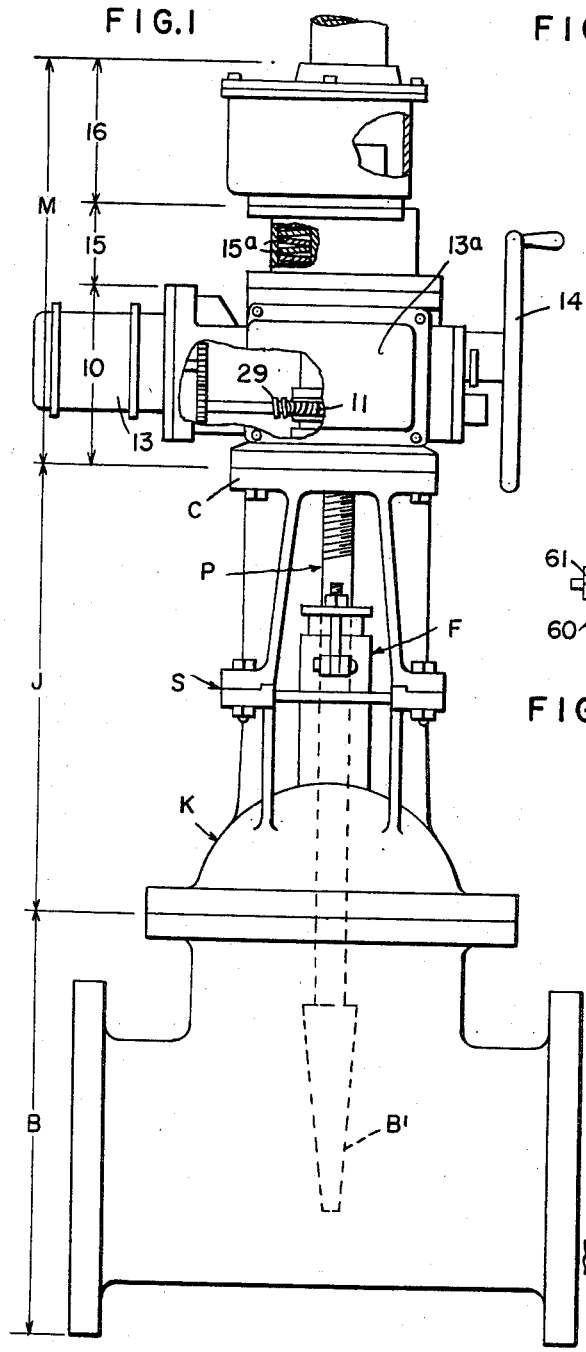
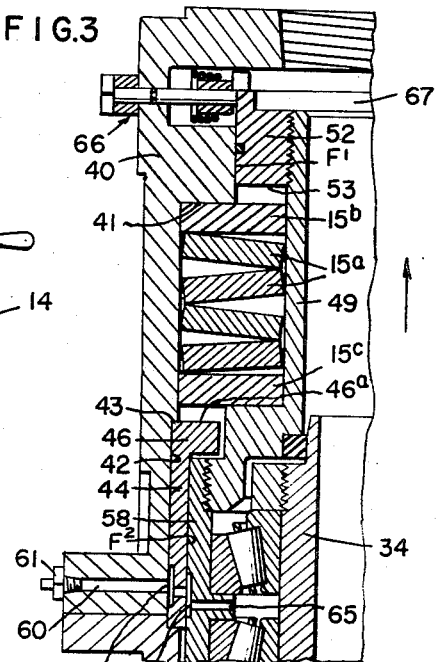
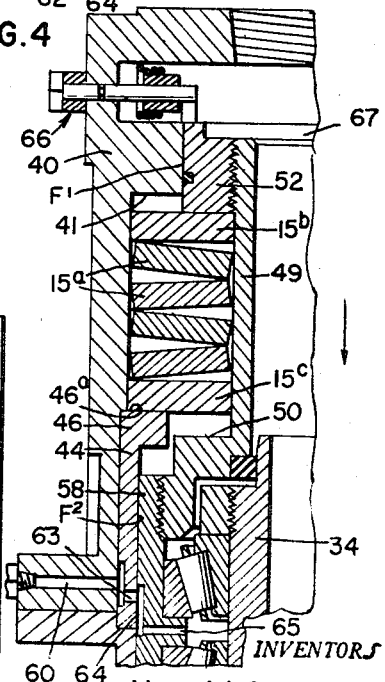
INVENTORS
Harold O. Kron
Walter J. Denkowski
BY
ATTY INVENTORS
Harold O. Kron
Walter J. Denkowski
BY
ATTY.

United States Patent Office 2,933,937
Patented Apr. 26, 1960

2,933,937

VALVE OPERATORS

Harold O. Kron, Philadelphia, and Walter J. Denkowski, Huntington Valley, Pa., assignors to Philadelphia Gear Corporation, Philadelphia, Pa., a corporation of Pennsylvania Application April 24, 1959, Serial No. 808,654

10 Claims. (Cl. 74—424.8)

This invention relates to power driven actuating mechanism for valves such as gate valves, globe valves, or disc valves, which have a yoke structure embodying a drive nut engaging a threaded valve stem for actuating the valve member. The yoke structure carries the actuating mechanism for rotating the nut so that upon such rotation of the nut by the mechanism axial movement of the stem will be effected for moving the valve to its seat or withdrawing the valve from the seat to its open position for respectively closing and opening the valve.

The invention of the present application is in the nature of an addition to or extension of copending application Serial No. 668,408, filed July 27, 1957, allowed November 26, 1958.

The power driven valve actuating mechanism herein set forth also embodies thrust and shock-absorbing compensating devices including a compression spring assembly for protecting the valve member against undue pressure upon the seating of the valve and upon movement of the valve to its open limit position and also protecting the valve stem against excessive thrust. Such excessive pressure or excessive thrust may be occasioned dynamically due to the momentum of the moving parts of the mechanism when the valve member reaches the end of the valve closing position or the limit of the valve open position, even though automatic power cut-off be provided. Such devices equally protect the stem against excessive thrust and damage such as might otherwise be brought about even under static conditions with the valve closed or open, as a result of heat expansion of the stem. Whereas the functioning of the thrust responsive spring assembly will protect the stem against excessive thrust forces as well as compensate for heat expansion of the valve stem, the springs will also act to hold the valve seated when the stem contracts.

The present invention accordingly in addition to the structure disclosed in the hereinbefore referred to allowed application, revolves around a power driven valve actuating mechanism which comprises as basic elements a housing mountable on the valve yoke structure, a main or master drive sleeve rotatable in the housing, but axially confined therein, between a pair of thrust and guide bearings, such as conical roller bearings, a drive nut concentric within the sleeve and bodily rotatable therewith while at the same time being axially movable in the drive sleeve, as by splining, an annular nonrotatable thrust member operatively an concentrically associated with the nut by means of a pair of annular thrust bearings, and compression spring means confined for compression or closing rebound by the valve between the axially movable thrust member and a relatively immovable abutment associated with or constituting a part of the housing and also so confined as to be compressed on rebound by the valve upon reaching its fully opened position, between a seat provided by the axially movable thrust member and a spring supporting sleeve and a coacting part of the axially movable thrust member remote from said thrust member seat. The master drive sleeve geared to the power drive means proper is rotated through the drive mechanism contained in, or associated with, or carried by the housing for moving the stem axially in one direction or the other to effect the opening or closing of the valve. Automatic power cut-off or limit switch devices operate at the end of each opening or closing operation. Also means for alternate hand operation are provided to activate the basic mechanism in case of power failure.

Nevertheless, "overrunning" of the drive mechanism when opening or closing the valve may bring its momentum to bear upon the valve stem and upon the valve member when the latter reaches its fully seated position or the limit of its open position. Yet, with the compensating means above outlined, the thrust energy of that momentum is cushioned and absorbed inasmuch as the thrust reaction force of the stem moves the drive nut axially relative to the master sleeve thereby effecting a corresponding compression of the spring means to the extent that such means must store up the energy of the momentum. Excessive dynamic shock stresses on the stem as well as excessive valve pressures produced upon the seating of the valve or upon movement of the valve to its open limit are thus precluded and damage to other parts of the mechanism avoided. The thrust absorbing compensating device is similarly effective to preclude damage to the valve stem and to the valve member by absorbing and compensating for extra thrust statically imposed upon the stem when axial heat expansion of the stem is involved.

While a number of such powered valve actuators equipped with thrust responsive compensating devices have been patented, there nevertheless has remained the unsolved practical problem of providing a thrust compensating device that is accurately responsive to thrust in both directions of movement of a valve and valve stem, as in the structure of the present invention, and well balanced in relation to the kind and magnitude of stresses to be encountered, as well as being readily acessible for inspection, adjustment or repair without requiring the bulk of the drive mechanism or any of its accessories and limit switch devices to be dismounted or otherwise disturbed.

Briefly, it is an object of the present invention to provide in and for the power driven valve actuating mechanism, a thrust compensating device having accurate thrust responsive characteristics and which not only functions to absorb thrust rebound resulting from the power driven seating of the valve element, but to also absorb thrust rebound resulting from operation or movement of the valve to its fully open position by means of power driven actuating mechanism.

The stated desirable objects of the invention are realizable in a sectionalized structure which comprises a first section carried by the yoke structure proper and containing the actuating mechanism, with the thrust responsive sub-assembly or second section mounted atop the basic housing. Notably a special rotatable and axially movable adapted thrust transmitting member functionally interconnects the drive nut of the first section with a spring loaded thrust member of the second section by way of annular thrust bearings surrounding this rotatable adapter member while sustaining the downward pressure of the spring loaded thrust member which is non-rotatable. The sub-assembly, as in the hereinbefore referred to application, is removable with the adapter member.

The spring loaded non-rotatable thrust member itself is generally bell shaped and embodies a wide cylindrical lower or body portion joined to a skirt extension housing and supporting the aforementioned annular thrust bearings between it and the special rotatable and axially movable adapter member and a hollow cylindrical neck of considerably smaller diameter rising from the larger diameter bottom or body portion to constitute therewith a shoulder or annular horizontal bearing face extending transversely of the stem axis. This bearing face is adapted to support in surrounding relation with the neck portion of the thrust member, a set of superimposed annular disc springs which are confined between the annular bearing face and a portion of an auxiliary housing or cap surrounding this spring assembly on the thrust member and fastened to the top of the first or basic housing.

Characteristic of this invention as associated with the structure disclosed in the previously referred to application is the important fact that this specially shaped thrust member carries upon the upper end of its neck portion a thrust collar guided with a sliding fit in the top end of the auxiliary housing and between which thrust collar and the said annular bearing face the said superimposed annular springs are held when the springs are in expanded or uncompressed condition, while the lower body portion is guided together with the said skirt extension thereof with a sliding fit within a sleeve member at the bottom of this housing. In one direction of movement of this thrust member the said spring means will be compressed between the said sleeve at one end of the set of spring means, and the bell carried thrust collar at the other end of this set of spring means as in the rebound thrust resulting from the movement of the valve to its fully open position by the drive mechanism while in the opposite direction of movement of the thrust member resulting from the rebound effect of closing the valve by the mechanical drive mechanism the superimposed springs will be compressed between the said annular bearing face at one end of the set of spring members and the said portion of the auxiliary housing at the other end of the set of springs.

The significance of the stated positive guidance lies in the fact that the axial movements of the thrust member being thus efficiently and independently guided will reflect accurately and without binding the amount of thrust reaction exerted upon the stem in the opening and closing operations of the valve, aided by the peripherally uniform distribution of the annular spring pressure acting upon the opposing bearing faces between which the spring members are confined. In other words, the task of operationally stabilizing the spring assembly here rests largely upon the mounting of the thrust member itself rather than upon the thrust bearing supporting it.

Another novel feature of the present invention resides in the provision of a stationary spring supporting sleeve positioned within the lower portion of the auxiliary housing and coacting with the horizontal bearing face of the cylindrical bottom portion of the thrust member to provide a wide seating for a lower element or member of the spring unit when the parts of the mechanism are in the "at rest" position or when the thrust member moves downwardly in executing the rebound motion resulting from the mechanical closing of the valve, together with the novel means for distributing lubricant to the inner side of such sleeve and to the skirt extension of the bell-like body portion of the thrust member.

In the drawings:

Fig. 1 is a general side view of the valve actuating mechanism as mounted upon a valve body, including the basic operating section containing the drive means proper, the second or intermediate operating section containing the thrust responsive compensating device, and the third or top operating section containing indicating devices;

Fig. 3 is a fragmentary detailed section illustrating the compressed condition of the spring means and the position of adjacent parts of the structure assumed as a result of a rebound of the valve and valve stem on the closing of the valve by power operated mechanism;

Fig. 4 is a fragmentary sectional detail corresponding to Fig. 3 but showing the compressed condition of the spring means and the relative positions of adjacent parts as produced by rebound of the valve and valve stem upon the movement of the valve to fully open position by power driven actuating mechanism.

Figure 2:
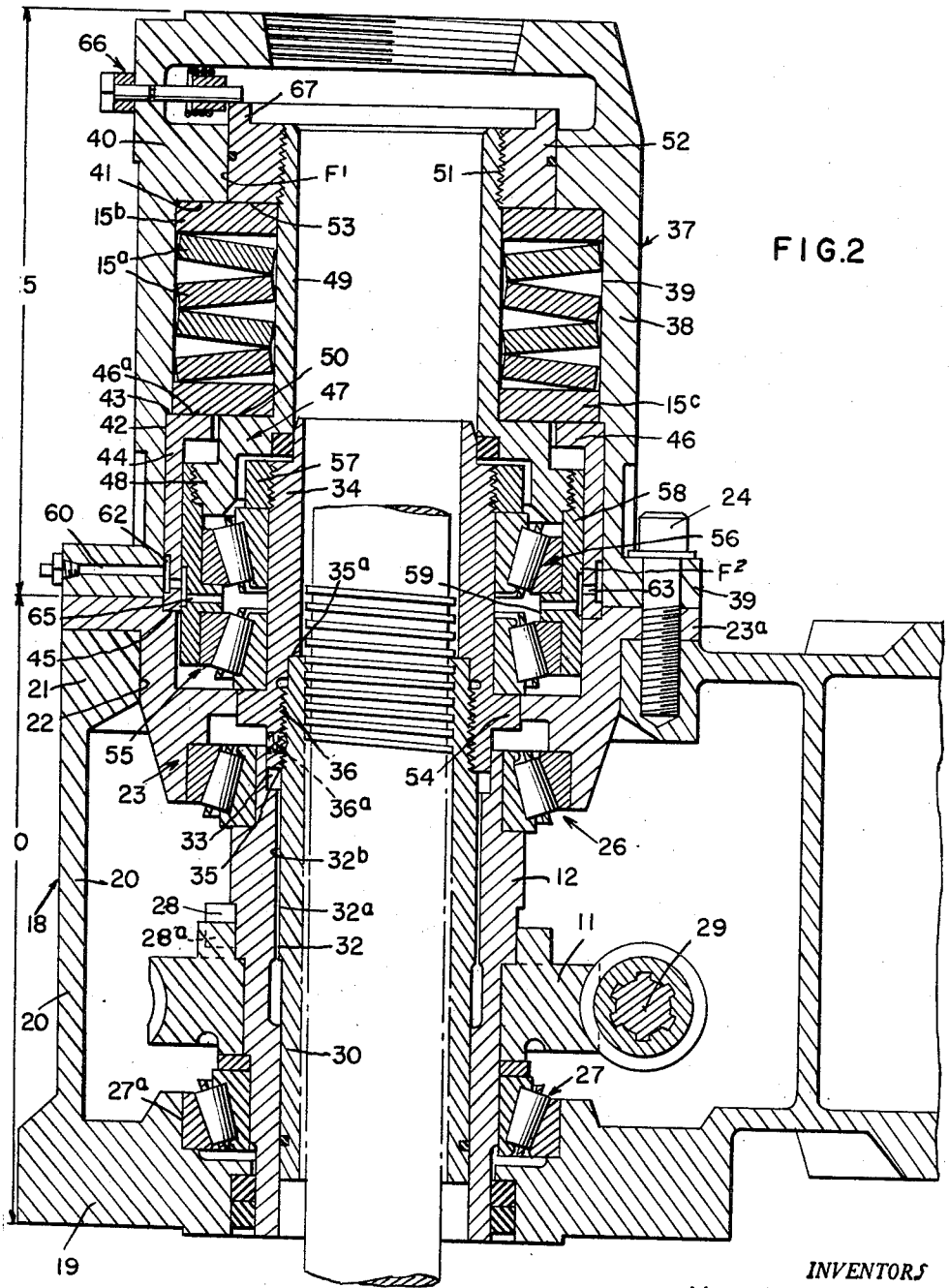
Fig. 2 is a vertical longitudinal section in a medial plane through the basic or main housing and the auxiliary housing.

The improved valve actuating mechanism embodied in the present invention as shown in Fig. 1 is designated by the letter M, the same being mounted by means of the flange connection C upon the familiar yoke structure S that rises from the valve cover K which in turn is connected by flange means to the valve body or valve housing designated by the letter B. Such housing contains a valve member, for example, a disc valve, a gate valve or the like generally designated B'.

The yoke structure S and the valve cover K are here jointly designated as the structural section J. Hence the valve unit as here exemplified comprises the actuating mechanism M, the structural section J and the valve housing B.

The valve unit further comprises a threaded valve stem P which passes upward through a stuffing box F associated with the yoke structure S and in driving engagement with the actuating mechanism M.

The power driven valve actuating mechanism M includes a first or basic operating section 10, containing usual drive mechanism indicated by the worm gear 11 which is fastened to a master drive sleeve 12, the rotation of which imparts up or down movement to the valve stem for effecting the opening and closing of the valve. Section 10 further includes a drive motor 13, and a hand wheel 14 indicating the provision of declutching means for hand operation of the mechanism as in the case of power failure. The basic first or main operating section 10 includes in its structure limit switches, not shown, for safety limiting the valve opening and closing movements and which limit switches are contained in a lateral compartment as indicated by the lateral cover plate 13a. Usually the basic mechanism also contains automatic declutching devices associated with the hand operated means for safeguarding the operator in the event that power actuation of the mechanisms unexpectedly takes over. The present invention, however, is concerned with the basic power driven actuating mechanism in conjunction with thrust responsive compensating devices which in addition to resiliently absorbing the valve seating axial thrust reaction force exerted upon the stem, as in the hereinbefore referred to application, also resiliently absorb thrust reaction force exerted upon the valve stem at the limit of opening movement of the valve, to thus protect the valve member, the stem and the mechanism against excessive strain or possible damage. In other words, the present invention broadly provides means for protecting the valve structure and the stem in its operating movements in both opening and closing directions by absorbing shock imposed upon the valve and stem by the power driven mechanism at the limits of such movements and such shock absorbing mechanism also functions following the absorption of the shock to return the valve to "at rest" position.

Upon the first or basic operating section 10 of the Fig. 1 mechanism there is mounted a second or intermediate operating section 15 containing the thrust responsive compensating devices comprising a set of superimposed dished disc springs 15a indicative of the nature of the thrust responsive compensating devices of the invention and which springs are located between upper and lower flat annular discs or washers 15b and 15c respectively.

The second or intermediate section 15 has mounted thereon a third or top operating section 16 in which are contained certain operational devices such as means for indicating the magnitude of the thrust reaction force of the valve stem as measured by the degree of spring compression and those which indicate the position or register the movement of the valve stem at any time during the opening or closing of the valve and which devices are all more particularly illustrated and described in the aforementioned copending and allowed application.

As illustrated particularly in Fig. 2, the basic operating section of the actuating mechanism comprises a basic housing 18 having a bottom portion 19, a vertical wall portion 20, and a top portion 21 with the opening 22 in which is fitted a flanged annular bearing retainer barrel 23, the flange of which is designated 23a and which is secured down upon the top portion 21 by screw bolts 24.

Rotatably mounted within the basic housing 18 is the master drive sleeve 12. This drive sleeve is axially confined between an upper bearing 26 mounted in the lower end of the annular retainer barrel 23, and a lower roller bearing generally designated 27 mounted in the bottom portion of the housing in the annular recess 27a. Each of these roller bearings functions as a combined thrust and guide bearing for the drive sleeve 12.

The worm gear has an interlocking connection with the drive sleeve 12 embodied in a lug 28 formed as a part of the drive sleeve which engages in a recess 28a in the worm gear 11 and this interlocking is of a nature to permit a lost motion between the gear 11 and the sleeve 12 whereby upon the application of driving force to the gear a hammer effect will be applied to the drive sleeve which will tend to jar loose the connection between the valve and its seat in the event that the valve is tightly seated or stuck for any reason.

The master drive sleeve 12 is driven by a worm 29 which is rotated by the motor 13, as part of the power driven basic mechanism to effect the opening and closing of the valve.

An internally threaded drive nut 30 engages the externally threaded valve stem and is located within the drive sleeve 12, the nut 30 having with the sleeve a torque transmitting spline connection 32. This spline connection comprises vertical outer ribs 32a formed upon the nut 30 to engage in the corresponding inwardly facing vertical grooves 32b formed in the drive sleeve 12. The upper end of the drive sleeve 12 is formed with an inner annular recess 33 of a depth sufficient to expose the upper end portion of the splining ribs 32a of the nut. The annular recess 33 thus forms a socket space for the reception of a lower end portion of a cylindrical rotatable adapter thrust transmitting member 34 which constitutes an important and characteristic part of this invention. This adapter thrust transmitting portion 34 is formed in its bottom portion with an inner annular recess 35 to receive the top end portion of the driving nut 30 which is seated at its upper end in the recess as indicated at 35a. The face of this recessed portion of the thrust transmitting member 34 is formed with screw threads 36 which engage with corresponding screw threads formed around the upper end portion of the driving nut 30. Thus the driving nut 30 and the thrust transmitting member are coupled together and will rotate as one or as a single unit.

In order to secure the threadably coupled thrust transmitting member and driving nut against any possibility of relative rotary motion, means is provided to lock them together, which means is here shown as comprising a set screw 36a which is threaded into the lower end portion of the thrust transmitting member 34 and is in frictional engagement with the threads carried by the drive nut 30, as illustrated.

The flange portion 23a of the bearing retainer barrel has mounted thereon an upstanding auxiliary housing 37. The body of this housing is designated 38 and the lower portion thereof is defined by the encircling flange 39 which rests upon the flange 23a to which it is secured by the previously referred to screw bolts 24.

The auxiliary housing encases in its upper portion the hereinafter described and previously referred to disc springs 15a and the upper and lower annular plates or washers 15b and 15c respectively between which the springs are retained, and the interior of the housing is formed to provide the chamber 39 the upper limit of which is defined by the inwardly extending flange 40 which provides the horizontal downwardly facing pressure face 41 which limits the upward movement of the washer 15b as illustrated in Figs. 2 and 3.

The lower portion of the chamber 39 has the wall thereof enlarged slightly in diameter forming the shallow recess 42 and the shoulder 43 at the upper end thereof. Within this recess is fitted a spring supporting sleeve 44 the lower end of which projects slightly beyond the flange 39 of the auxiliary housing and seats in the annular recess 45 formed in the upper portion of the bearing retaining barrel 23.

The top end of the sleeve 44 is defined by the inwardly projecting annular flange 46 which, as shown, extends radially inwardly into the chamber 39 and provides a stationary pressure face 46a, which in the "at rest" position of the mechanism and in another position of the operating parts, supports the lower spring bearing washer 15c.

The numeral 47 generally designates a substantially bell-shaped thrust member which embodies at its lower end the bell portion 48 with which is integrally formed the tubular bell neck 49. The upwardly extending cylindrical neck portion 49 forms with the lower portion or bell or body portion 48, an annular shoulder 50 which provides a lower annular pressure face supporting the annular superimposed disc springs 15a and the top and bottom washer members 15b and 15c.

In the "at rest" position of the mechanism this pressure face 50 is in a common plane with the supporting face or surface 43 of the flange 46 of the spring supporting sleeve 44.

The top end of the bell neck 49 is externally threaded as indicated at 51 and encircling this top end of the bell neck and threadably attached thereto is a bell thrust collar 52 which fits within the auxiliary housing flange 40 for sliding axial movement therein. This thrust collar is adapted to move above the flange 40 and below the flange in the operation of the mechanism and it provides a lower thrust face 53 which is adapted to come into bearing engagement with the top surface of the uppermost spring retaining washer 15b as shown in Figs. 2 and 4. As is also illustrated in Fig. 2, when the mechanism is in the "at rest" position where the springs are under relieved or relaxed tension, the bearing face 53 will be in a common plane with the pressure or bearing face 41 formed by the underside of the flange 40.

The non-rotating bell-shaped thrust member 42 is supported upon the rotatable adapter thrust transmitting member 34 in the following manner. The member 34 carries an encircling outwardly projecting shoulder 54 upon which rests the lower one of a pair of opposed roller thrust bearings. The lower one of this pair of thrust bearings is designated 55 and the inner race thereof, as shown encircles the adapter thrust transmitting member and rests upon the shoulder 54.

The upper one of the pair of opposed thrust bearings is designated 56 and the inner race thereof is in encircling relation with the adapter thrust transmitting member and is engaged upon the upper side by the retaining collar 57 which is threaded onto the upper end of the thrust transmitting member, as shown.

The pair of opposing thrust bearings are housed within a bell bearing sleeve or bell skirt extension designated 58. This bell sleeve or skirt extension receives in its upper end a lower portion of the bell 48 to which it is threadably joined as illustrated. Intermediate its ends the bell sleeve or skirt extension 58 carries the inwardly projecting annular bearing spacer rib 59 which is engaged upon its top and bottom sides by the outer faces of the upper and lower thrust bearings, respectively.

The bell sleeve or skirt extension is fitted to have axial non-rotating movement within the spring supporting sleeve 44.

The numeral 60 designates a lubricant admitting bore formed radially of the flange 39 of the auxiliary housing and closed at its outer end by the conventional fitting 61 which is adapted to have a grease gun connected therewith for injecting grease or lubricant into the bore, and at its inner end the bore 60 communicates with a lubricant manifold 62 in the form of an annular channel or recess in the outer surface of the spring supporting sleeve 44. This manifold or channel 62 communicates with one or more apertures 63 which extend entirely through the sleeve 44 and they in turn communicate with an inner lubricant manifold 64 formed in the outer surface of the bell sleeve or skirt extension 58. This inner manifold 64 is of sufficient vertical extent or height to ensure its constant communication with the aperture 63 at all times during the up and down or reciprocating movements of the bell sleeve.

Communicating with the inner manifold 64 are radially extending feed passages 65 leading inwardly through the bearing spacer rib 59 whereby lubricant can be fed into the space between the opposed thrust bearings and the bearings accordingly kept lubricated at all times.

The reference character 66 generally designates the spring compression indicating device which is fully illustrated and described in the hereinbefore referred to allowed application and which device is actuated in the present case by being engaged with the upstanding flange 52 or rim 67 which forms a part of the bell thrust collar 52 in the rebound movements of the valve and valve stem during the opening and closing of the valve by means of the mechanically operated mechanism. In view of the fact that this compression indicating device is fully illustrated and described in the hereinbefore referred to application, it is not believed that a detailed illustration and description of the same in the present case is required.

When the valve with which the present improved mechanism is associated is in the "at rest" position, either opened or closed, the thrust responsive device contained within the auxiliary housing 37 will be in the position illustrated in Fig. 2. In this position of the several parts it will be seen that the superimposed spring discs 15$^a$ will have separating surfaces between them and the upper and lower ones thereof will be in contact with the upper and lower flat washers 15$^b$ and 15$^c$ respectively. Also the upper washers 15$^b$ will be engaged with their top surfaces flat against the aligned thrust faces 41 and 53, while the lowermost flat washer 15$^c$ will be at rest flat upon the thrust surface 50 and the top surface of the flange portion 46 of the spring supporting sleeve 44.

In the operation of the mechanism, starting with the valve in its "at rest" and open position, the energization of the motor 13 in the proper direction will rotate the drive nut to lower the stem to effect valve closing, suitable limit switch devices operating to cut off the motor at a suitable point when the valve is seating. However, the momentum of the motor and the parts of the mechanism may produce the phenomenon of "overrunning," whereby undue pressure may be exerted upon the valve seat and upon the stem. However, undue pressure condition or shock is prevented and any possible damage to the parts avoided by the operation of the thrust-responsive compensating means here illustrated and enclosed in the section 15 of the mechanism. That is to say, any excess momentum or axial thrust reaction upon the valve closing will cause a corresponding axial upward displacement of the drive nut 30 in drive sleeve 12, the adapter thrust transmitting member 34, the dual thrust bearings 55 and 56 and the bell-shaped thrust member 47, whereupon the momentum will be absorbed by corresponding compression of the superposed dished disc springs 15$^a$, thereby protecting the valve seat against excessive seating pressure and the stem and other moving parts against excessive strain and wear and tear and damage.

Fig. 3 illustrates this action of the thrust responsive compensating means when thrust is applied to the parts referred to. It will be seen upon reference to this figure that when the upward movement of the bell-shaped thrust member and of the adapter thrust transmitting member occurs, both of the thrust bearings 55 and 56 will move upwardly with the bell bearing sleeve or skirt extension, the upward thrust being transmitted from the thrust transmitting member to the lower thrust bearing 55 and from this such thrust is transferred to the bearing spacer rib and through this to the skirt extension and to the bell-shaped thrust member. It will also be seen that the spring 15$^a$ in this action will be compressed between the compression surface 41 of the flange 40 and the compression surface 50 at the top of the bell 48, the lower flat washer 15$^c$ being raised from the top of the flange 46 which forms a part of the spring supporting sleeve, while the bell thrust collar is elevated away from the uppermost washer 15$^b$. In this action it will be seen that the flange 67 of the bell thrust collar acts upon the overlying portion of the spring compression indicator 66 which, as previously stated, is fully described and illustrated in the copending allowed application, and the extent of valve seating thrust will be indicated by this spring compression indicator, the function of which is a true reflection of the thrust, with the thrust member 47 being effectively guided as at F$^1$ and F$^2$. In other words, this guidance of the thrust member 48 will be a function of the outer surface of the bell thrust collar against the surrounding flange 40 and of the outer surface of the bell bearing sleeve or skirt extension against the inner surface of the fixed non-rotating and non-axially moving spring supporting sleeve 44. If the dynamic conditions or pressures are found to be such as to require correction, such correction can be easily effected due to the ready accessibility of the superposed disc springs contained in the chamber 39 of the auxiliary housing 37.

In the operation of raising the valve stem to open or unseat the valve, the motor 13, of course, drives the gear 11 in the opposite direction to rotate the drive nut 30 in the proper direction to draw the valve stem upwardly. In this action the down thrust applied to the nut 30 is opposed by the non-axially movable, rotatable adapter thrust transmitting member 34 which is coupled to the nut 30 by the screw threads upon the nut and the thrust transmitting member 34, or in any other suitable manner, whereby, as previously stated, separation of the member 34 and the nut 30 is prevented. The hereinbefore referred to suitable limit switch devices provided under the cover 13$^a$ will, of course, cut off the motor power at the proper time at the end of the valve opening movement or, in other words, at the upper limit of movement of the valve. However, in this case also the momentum of the motor and of the parts of the mechanism may produce the overrunning of the valve stem in the same way as described in connection with the operation of the mechanism for the closing of the valve. In such case, reverse or downward thrust of the valve and the stem may take place and in this action the reverse movement of the adapter thrust member 34 imposes through the collar 57 joined to the upper end thereof, and through the threaded joint, a downward thrust against the inner race of the upper thrust bearing 56 and such thrust will be transmitted through the bearing to the bearing spacer rib, to the bell bearing sleeve or skirt extension and effect downward movement of the bell 47 in the manner illustrated in Fig. 4. Upon the occurrence of this downward movement of the parts referred to, the bell thrust collar 52 will impose downward pressure upon the set of superposed disc springs, by its engagement first upon the topmost flat washer 15ᵇ, whereupon the lowermost flat washer 15ᶜ will be pressed down against the top of the flange 46 which forms a part of the spring supporting sleeve 44, the spring means being accordingly compressed therebetween. The seat 50 at the top of the bell 48 then leaves the underside of the lowermost washer 15ᶜ, as here illustrated.

The spring compression indicator W will here again function as the flange 67 at the top of the bell thrust collar moves downwardly relative to the contact finger of the indicator mechanism which is in engagement with the flange 67, the mechanism of the indicator here functioning under the action of a control spring and thus indicating the extent of thrust exerted upon the valve and stem at the limit of their opening movement. As hereinbefore stated, if the indicated conditions warrant, necessary correction can be easily effected by removing the housing 37, for the quick substitution of weaker or stronger disc springs without disturbing the actuating mechanism proper or individual disc springs can be removed or added as the case may be.

Objectionable thrust may also be experienced due to thermal expansion of the valve stem even after the valve member has been seated or after it has been moved to fully opened position, in which case the thrust responsive means with the spring washers will function to prevent damage to the parts from excess pressures.

It will also be apparent from an examination of the parts immediately surrounding the opposing thrust bearings 55 and 56 that these bearings can be kept well lubricated at all times by injection of the lubricant into the passage 60 to pass therefrom into the outer and inner manifolds 62 and 64 and then into the space between the pair of thrust bearings by way of the passage 65, and due to the positioning of the inner manifold 64, it will be seen that it is always in communication with the passage 63 which connects it with the outer manifold 62 so that the lubricant can pass from the passage 60 and from one manifold to the other, both upon the upward movement of the skirt 58 relative to the spring supporting sleeve 44 or upon the downward movement of the skirt.

As illustrated in Fig. 2, where the mechanism is shown in the "at rest" position, the disc springs 15ᵃ are arranged so that in some instances two adjoining springs will contact one another only at the outer corners and other adjoining ones will contact one another only at the inner corners. The springs in this instance are in the unflexed condition. By the provision of the flat annular plates or washers 15ᵇ and 15ᶜ at the upper and lower ends of the group of springs, when the springs are put under compression in both the valve closing thrust action and the valve opening thrust action, the uppermost and lowermost springs are prevented from tipping as might be the case due to the fact that the pressure would be applied only to the outer half of the upper spring and the inner half of the lower spring in one case, or to the inner half of the upper spring and the outer half of the lower spring in the other case. When the springs 15ᵃ are in the normal condition shown in Fig. 2, that is, after the valve stem has come to rest following the opening or closing of the valve, there will be a substantial angle of separation between opposing surfaces of the springs and under the thrust resulting from the shutting or opening of the valve the springs will be compressed to an appreciable degree, reducing the angle of separation as illustrated in Figs. 3 and 4, but the springs will be so tensioned that this reduction in angle between opposing faces will never be sufficient to bring the faces into flat engagement.

Other modes of applying the principle of the invention may be employed, change being made as regards the details described, provided that there be employed the features described in the claims or the functional as well as conjointly cooperative equivalents of such features.

We claim:

1. A valve construction having a threaded rotatable valve stem rising from the valve gate by means of a drive mechanism carried by the yoke structure of the valve; comprising a rotatably supported drive nut threaded on the stem and having limited axial movement therewith, a driving sleeve encircling the drive nut for transmitting rotational driving motion from a power source to the sleeve, up and down axially spaced thrust bearings encircling and supporting the drive sleeve for rotary motion while holding the same against axial movement, a first housing for the foregoing elements, a second housing mounted upon the first housing and having an inwardly projecting flange in the top portion thereof providing a downwardly directed stationary upper pressure face and defining a top opening, a non-rotatable but axially movable thrust member embodying a bell portion carrying an upstanding tubular neck portion entering said top opening and into which neck portion the valve stem is adapted to enter, the exterior of the bell portion having a lower upwardly directed pressure face axially movable with the thrust member, spring means within the second housing encircling said neck portion and confined between said upper and lower pressure faces, means for transmitting at one time upward spring-compressing thrust from the drive nut to the thrust member and through the thrust member to the spring means as well as for transmitting reverse downward thrust from the spring means through the thrust member to the drive nut, said thrust transmitting means including an annular adapter member coupled to and extending upwardly from the drive nut to be both rotated and axially moved thereby, auxiliary thrust bearings encircling said annular adapter member, means coupling said auxiliary thrust bearings both with the adapter member and the bell portion for axial movement therewith and whereby the adapter member may move additionally rotatably, and additional upper and lower pressure face forming means between which said spring means is confined and wherein the additional upper pressure face forming means is coupled to and axially movable with said neck portion and the said lower pressure face forming means is stationary.

2. The invention according to claim 1, wherein the said other upper pressure face forming means comprises a collar secured about the upper end portion of said neck portion and the said lower pressure face forming means comprises an annular member fixed to and extending inwardly in encircling relation with the top part of said bell portion.

3. A valve construction having a threaded rotatable valve stem rising from the valve gate by means of a drive mechanism carried by the yoke structure of the valve; comprising a rotatably supported drive nut threaded upon the stem and having limited axial movement therewith, a driving sleeve encircling the drive nut for transmitting rotational driving motion from a power source to the nut, up and down axially spaced thrust bearings encircling and supporting the drive sleeve for rotary motion while holding the same against axial movement, a first housing for the foregoing elements, a second housing mounted upon the first housing and forming a chamber having an inwardly projecting flange in the top portion thereof providing a downwardly directed stationary upper pressure face and defining a circular top opening providing a vertical guide sleeve, a non-rotatable but axially movable thrust member embodying a bell portion carrying an upstanding tubular neck portion into which neck portion the valve stem is adapted to enter, the exterior of the bell portion having a lower upwardly directed pressure face axially movable with the thrust member, an annular collar secured about the upper end of said neck portion and fitting for axially sliding in said vertical guide sleeve, said annular collar further providing an additional upper and axially movable downwardly directed pressure face, means forming an additional lower and non-movable upwardly directed pressure face, spring means within the chamber of the second housing encircling the neck portion and confined between the two upper pressure faces and the two lower pressure faces, means for transmitting at one time upward spring compressing thrust from the drive nut to the thrust member and through the thrust member to the spring means to compress the spring means between said stationary upper pressure face and said lower axially movable pressure face as well as for transmitting reverse downward thrust from the compressed spring means through the thrust member to the drive nut, said transmitting means additionally functioning for imparting at one time downward spring compressing thrust from the drive nut to the thrust member and through the thrust member to the spring means to compress the spring means between said axially movable upper pressure face and said non-movable lower pressure face as well as for transmitting reverse upward thrust from the compressed spring means through the thrust member to the drive nut, said transmitting means including an annular adapter member coupled to and extending upwardly from the drive nut to be rotated and axially moved thereby, auxiliary thrust bearings encircling said annular adapter member, and means coupling the said auxiliary thrust bearnigs both with the adapter member and the bell portion for both axial and rotational movements.

4. A valve construction having a threaded rotatable valve stem rising from the valve gate by means of a drive mechanism carried by the yoke structure of the valve; comprising a rotatably supported drive nut threaded on the stem and having limited axial movement therewith, a driving sleeve encircling the drive nut for transmitting rotational driving motion from a power source to the sleeve, up and down axially spaced thrust bearing encircling and supporting the drive sleeve for rotary motion while holding the same against axial movement, a first housing for the foregoing elements, a second housing mounted upon the first housing and forming a chamber having an inwardly projecting flange in the top portion thereof providing a downwardly directed stationary upper pressure face and defining a circular top opening providing a vertical guide sleeve, a non-rotatable but axially movable thrust member, said thrust member having a bell portion including a depending annular skirt and an upstanding tubular neck portion coaxial with the valve stem, means carried by the neck portion engaged for axial sliding movement in said guide sleeve and providing an upper downwardly facing movable pressure face, means carried by the thrust member in encircling relation with said neck and forming an axially movable upwardly directed lower pressure face, means forming a stationary upwardly directed lower pressure face in encircling relation with the movable lower pressure face, spring means encircling said neck and confined between said upper and lower pressure faces, said spring means and pressure faces having an "at rest" position when the valve is in both its fully closed and fully opened positions and in which "at rest" positions the two upper pressure faces are flush with one another and the two lower pressure faces are flush with one another, and the spring means is in a substantially uncompressed condition, a thrust transmitting member coaxial with and secured to the upper end of the drive nut and encircled by said bell portion skirt, and a pair of upper and lower thrust bearings encased in said skirt and encircling and forming an operative coupling between the same and the thrust transmitting member, means maintaining said pair of thrust bearings against axial movement relative to the skirt and thrust transmitting member and one of the last bearings being adapted to take upward thrust and the other one being adapted to take downward thrust.

5. The invention according to claim 4, wherein the said means carried by the tubular neck portion comprises a collar threaded on the top end of the neck portion.

6. The invention according to claim 4, wherein the said spring means consists of a group of superimposed oppositely tilted dished disc springs, and top and bottom flat annular discs having the group of springs therebetween and engaged by said upper and lower pressure faces.

7. The invention according to claim 4, wherein the said means forming the upwardly directed lower pressure face comprises an annulus secured against the wall of the second housing chamber and projecting inwardly therefrom.

8. The invention according to claim 4, with means forming a bearing sleeve encircling said bell portion skirt and fixed to the wall of the second housing chamber, the skirt having axial sliding movement against and within said sleeve.

9. The invention according to claim 8, with means for introducing lubricant between the skirt and sleeve from the outside of the second housing and means for passing the lubricant to the last named means in between the pair of thrust bearings.

10. The invention according to claim 4, wherein each thrust bearing of said pair embodies an inner race, an outer face and a series of rotating elements between the races and the said means maintaining the pair of thrust bearings against the said axial movements comprises a separating element between said outer races and carried by said skirt and spaced upper and lower bodies carried by and encircling the thrust transmitting member and respectively engaging the upper side of the upper inner race and the lower side of the lower inner race.

References Cited in the file of this patent
UNITED STATES PATENTS

| | | |
|---|---|---|
| 2,222,699 | Ball | Nov. 26, 1940 |
| 2,240,977 | Bryant et al. | May 6, 1941 |
| 2,317,529 | Hodgson et al. | Apr. 27, 1943 |
| 2,351,211 | Hodgson | June 13, 1944 |